US011269113B2

(12) United States Patent
Kauerauf et al.

(10) Patent No.: US 11,269,113 B2
(45) Date of Patent: Mar. 8, 2022

(54) MODELING OF OIL AND GAS FIELDS FOR APPRAISAL AND EARLY DEVELOPMENT

(71) Applicant: SCHLUMBERGER TECHNOLOGY CORPORATION, Sugar Land, TX (US)

(72) Inventors: Armin Kauerauf, Aachen (DE); Oliver C. Mullins, Ridgefield, CT (US); Thomas Hantschel, Aachen (DE); Kang Wang, Houston, TX (US); Adrian Kleine, Aachen (DE); Youxiang Zuo, Burnaby (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 516 days.

(21) Appl. No.: 16/318,127

(22) PCT Filed: Jul. 22, 2016

(86) PCT No.: PCT/US2016/043441
§ 371 (c)(1),
(2) Date: Jan. 15, 2019

(87) PCT Pub. No.: WO2018/017108
PCT Pub. Date: Jan. 25, 2018

(65) Prior Publication Data
US 2019/0293835 A1 Sep. 26, 2019

(51) Int. Cl.
G06G 7/48 (2006.01)
G01V 99/00 (2009.01)
G06F 30/23 (2020.01)
G06F 111/10 (2020.01)

(52) U.S. Cl.
CPC .............. *G01V 99/005* (2013.01); *G01V 99/00* (2013.01); *G06F 30/23* (2020.01); *G01V 2210/661* (2013.01); *G06F 2111/10* (2020.01)

(58) Field of Classification Search
CPC .............. G01V 2210/661; G01V 99/00; G01V 99/005; G06F 2111/10; G06F 30/23
See application file for complete search history.

(56) References Cited

U.S. PATENT DOCUMENTS

| 8,165,817 | B2 | 4/2012 | Soraya et al. |
| 8,849,639 | B2* | 9/2014 | Brown ................ E21B 49/00 703/10 |
| 10,083,258 | B2 | 9/2018 | Armin et al. |

(Continued)

FOREIGN PATENT DOCUMENTS

WO 2012/015521 A1 2/2012

OTHER PUBLICATIONS

Schlumberger: ECLIPSE Technical Description, Industry-Reference Reservoir Simulator, Improving Simulation Data, Version 2014.2 (2014) (front cover—p. 508).

(Continued)

Primary Examiner — Rehana Perveen
Assistant Examiner — Nithya J. Moll
(74) Attorney, Agent, or Firm — Michael Guthrie

(57) ABSTRACT

A method, apparatus, and program product model address a modeling gap existing between basin and reservoir modeling through the use of a Reservoir Fluid Geodynamics (RFG) model usable for simulations conducted at a relatively fine spatial resolution and over a geological timescale.

21 Claims, 9 Drawing Sheets

(56) References Cited

U.S. PATENT DOCUMENTS

| | | | | |
|---|---|---|---|---|
| 2002/0120429 | A1* | 8/2002 | Ortoleva | G01V 11/00 |
| | | | | 703/2 |
| 2006/0025976 | A1* | 2/2006 | Kennon | G06F 30/23 |
| | | | | 703/10 |
| 2010/0228485 | A1 | 9/2010 | Betancourt et al. | |
| 2011/0015912 | A1 | 6/2011 | Kacewicz et al. | |
| 2011/0141851 | A1 | 6/2011 | Kacewicz et al. | |
| 2011/0288831 | A1* | 11/2011 | Tan | G01V 1/28 |
| | | | | 703/2 |
| 2013/0046524 | A1 | 2/2013 | Gathogo | |
| 2015/0025858 | A1* | 1/2015 | Kulkarni | E21B 43/26 |
| | | | | 703/2 |
| 2015/0120262 | A1 | 4/2015 | Dulac et al. | |
| 2015/0205001 | A1 | 7/2015 | Carruthers et al. | |
| 2015/0247941 | A1 | 9/2015 | Fiduk et al. | |
| 2016/0098502 | A1* | 4/2016 | Havre | E21B 43/00 |
| | | | | 703/9 |

OTHER PUBLICATIONS

Schlumberger: ECLIPSE Technical Description, Industry-Reference Reservoir Simulator, Improving Simulation Data, Version 2014.2 (2014) (pp. 509-1128).
Schlumberger: ECLIPSE, Reference Manual, Industry-Reference Reservoir Simulator, Version 2014.2 (2014) (front Dover—p. 500).
Schlumberger: ECLIPSE, Reference Manual, Industry-Reference Reservoir Simulator, Version 2014.2 (2014) (pp. 501-1000).
Schlumberger: ECLIPSE, Reference Manual, Industry-Reference Reservoir Simulator, Version 2014.2 (2014) (pp. 1001-1500).
Schlumberger: ECLIPSE, Reference Manual, Industry-Reference Reservoir Simulator, Version 2014.2 (2014) (pp. 1501-2001).
Schlumberger: ECLIPSE, Reference Manual, Industry-Reference Reservoir Simulator, Version 2014.2 (2014) (pp. 2002-2786).
International Preliminary Report on Patentability for the equivalent International patent application PCT/US2016/043441 dated Jan. 31, 2019.
Aziz, et al., "Petroleum Reservoir Simulation," Elsevier, 1979.
England, "Reservoir geochemistry—A reservoir engineering perspective," Journal of Petroleum Science and Engineering 58 (2007).
England, et al., "Modelling density-driven mixing rates in petroleum reservoirs on geological time-scales, with application to the detection of barriers in the Forties Field (UKCS)," From Cubitt, J. M. and England, W. A. (editors), The Geochemistry of Reservoirs, Geological Society Special Publication No. 86, pp. 185-201. (1995).
Hantschel, et al., "Fundamentals of Basin and Petroleum Systems Modeling," Springer (2009).
Wang, et al., "Differing Equilibration Times of GOR, Asphaltenes and Biomarkers as Determined by Charge History and Reservoir Fluid Geodynamics," Petrophysics, vol. 56, No. 5, 2015.
International Search Report and Written Opinion for the equivalent International patent application PCT/US2016/043441 dated Apr. 14, 2017.
Chen, et al., "Integrated Reservoir Simulation and Basin Models: Reservoir Charging and Fluid Mixing," A Next-Generation Parallel Reservoir Simulator for Giant Reservoirs, Jan. 1, 2009.
Extended Search Report for the counterpart European patent application No. 16909699.7 dated Mar. 13, 2020.
Communication Pursuant to Article 94(3) issued in the counterpart European patent application 16909699.7 dated Jul. 28, 2021, 15 pages.

* cited by examiner

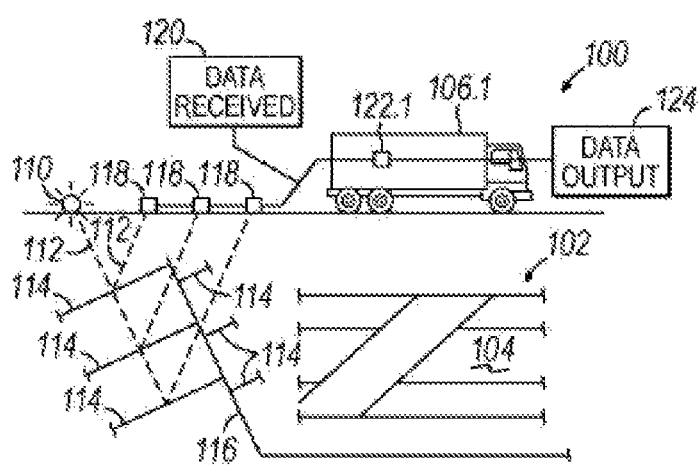 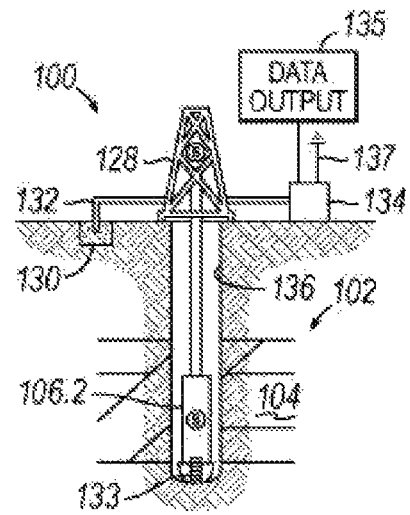
FIG. 2A  FIG. 2B
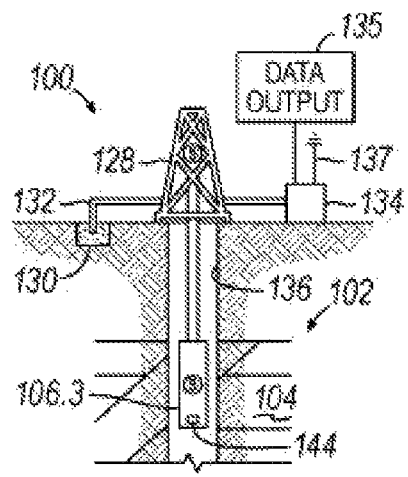 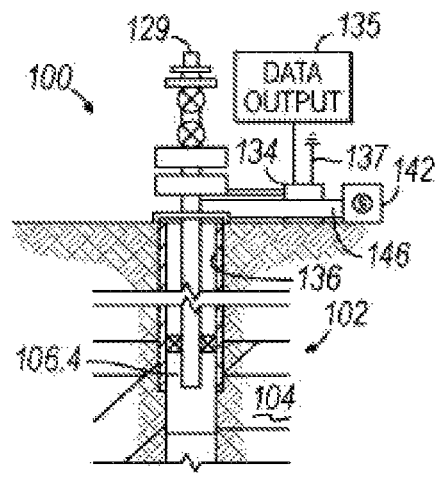
FIG. 2C  FIG. 2D

MODELING OF OIL AND GAS FIELDS FOR APPRAISAL AND EARLY DEVELOPMENT

BACKGROUND

Subsurface modeling of geological and physical processes is commonly performed in oil and gas exploration, field development, and production especially with regard to the overall understanding of the geological background, scenario evaluation, and quantitative value assessments with subsequent decision making. Field operations in the oil industry are commonly classified into four phases: exploration, appraisal, development and production. However, existing modeling and simulation fails to address all of these phases. Modeling and simulation for the exploration phase generally focuses on basin modeling, i.e., the formation of sedimentary basins, the generation of hydrocarbons in source rocks, the migration of hydrocarbons and the accumulation of hydrocarbons in traps. Production and later stage development are generally supported by higher resolution reservoir modeling that focus on subsurface flow and include processes such as hydrocarbon displacement by water injection. Appraisal and early development, however, have little support by way of modeling and simulation.

Exploration modeling generally relies on geological timescales of millions of years and are constructed for regional length scales of hundreds of kilometers. Reservoir modeling, in contrast, generally covers production timescales up to decades and field sizes up to a few kilometers. As a result, a substantial gap exists between exploration and reservoir modeling.

SUMMARY

The embodiments disclosed herein provide a method, apparatus, and program product that in one aspect model a subsurface formation by accessing a Reservoir Fluid Geodynamics (RFG) model of the subsurface formation, where the RFG model is organized as a spatial array having a first spatial resolution and describing at least a portion of the subsurface formation, the RFG model including basin data generated from a basin simulation of the subsurface formation at a second spatial resolution that is coarser than the first spatial resolution, and running a computer simulation on the RFG model over a geological timescale and at the first spatial resolution using at least one processing unit.

In some embodiments, the first spatial resolution is sufficient to model in reservoir diffusion in the subsurface formation, and the second spatial resolution is insufficient to model in reservoir diffusion in the subsurface formation. In some embodiments, the first spatial resolution is finer than about 100 meters, and the geological timescale is greater than about 100 years. Further, in some embodiments, the first spatial resolution is between about 1 and about 100 meters, and the geological timescale is between about 100 and about 100 million years.

Some embodiments also include generating the RFG model, where generating the RFG model includes cutting out a region of interest from the subsurface formation, wherein the RFG model describes the cut out region of interest. In some embodiments, generating the RFG model includes refining the basin data to populate the RFG model at the first spatial resolution, and in some embodiments, generating the RFG model includes populating the RFG model with present day properties of the subsurface formation, where the present day properties include rock composition and/or rock properties generated from seismic data and/or well data. In some embodiments, generating the RFG model further includes extrapolating the present day properties back in geological time, and in some embodiments, generating the RFG model further includes convoluting the basin data and the present day properties into a single data set. Some embodiments also include generating boundary data for the computer simulation on the RFG model, the boundary data including in and outflow of energy, water, hydrocarbons and/or non-hydrocarbons, masses, pressures and/or mechanical constraints.

In some embodiments, the RFG model includes subsurface map data, fault data and rock property data describing volumes between mapped surface defined by the subsurface map data, and in some embodiments, running the computer simulation includes forward modeling evolution of mass and energy distributions over the geological timescale and at the first spatial resolution using differential equations derived from local mass and energy conservation and disequilibrium forces of quantities that try to equilibrate. Further, in some embodiments running the computer simulation includes modeling one or more processes, each of the one or more processes selected from the group consisting of: diffusion of fluid compounds; fluid phase separation; separate phase flow; biodegradation and biological sulfate reduction; secondary chemical cracking of oil; asphaltene flocculation; tar mat formation; pressure, temperature and stress variations; gas hydrates; flow baffling up to compartmentalization; thermochemical sulfate reduction; rock compaction, fracturing and rock failure; fluid rock interactions; magmatic intrusions; ground water flow; convection; $CO_2$ sequestration; and diffusion of radioactive compounds.

In some embodiments, running the computer simulation includes modeling a plurality of geological processes and modeling an interaction of at least two of the plurality of geological processes. Some embodiments also include calibrating the RFG model by comparing simulated fluid distributions generated by running the computer simulation with downhole fluid analysis (DFA) measurement data and iteratively tuning the RFG model based upon the comparison. Some embodiments also include populating an upstream model with data generated from running the computer simulation and running a second computer simulation on the upstream model. Also, in some embodiments the upstream model comprises a reservoir model, and populating the upstream model includes populating the reservoir model with an initial distribution of hydrocarbon compounds generated from running the computer simulation on the RFG model.

Some embodiments also include maintaining within an integrated subsurface model the basin data, RFG data from the RFG model and upstream data usable in a finer resolution and shorter timescale upstream simulation, and running basin, RFG and upstream simulations using data accessed from the integrated subsurface model. Further, running the basin, RFG and upstream simulations includes running the basin simulation to generate first result data, storing the first result data in the integrated subsurface model, refining and cutting out a portion of the first result data, running the RFG simulation using the refined and cut out portion of the first result data to generate second result data, refining and cutting out a portion of the second result data, and running the upstream simulation using the refined and cut out portion of the second result data.

Some embodiments also include an apparatus including at least one processing unit and program code configured upon execution by the at least one processing unit to model a subsurface formation using the various operations discussed above. Some embodiments also include a program product including a non-transitory computer readable medium and program code stored on the computer readable medium and configured upon execution by at least one processing unit to model a subsurface formation using the various operations discussed above.

Moreover, some embodiments include an integrated subsurface formation simulation environment, which includes at least one processing unit and one or more non-transitory computer readable media, an integrated subsurface model stored on the one or more non-transitory computer readable media, the integrated subsurface model including basin data generated from basin simulation, Reservoir Fluid Geodynamics (RFG) data generated from RFG simulation, and reservoir data generated from reservoir simulation, and program code configured upon execution by the at least one processing unit to build a basin model from the integrated subsurface model, provide the basin model for use in a basin simulation at a first spatial resolution and over a first geological timescale, store first result data from the basin simulation in the integrated subsurface model, build an RFG model from the integrated subsurface model by refining the first result data from the basin simulation to a second spatial resolution that is finer than the first spatial resolution, provide the RFG model for use in an RFG simulation at the second spatial resolution and over a second geological timescale that is shorter than the first geological timescale, store second result data from the RFG simulation in the integrated subsurface model, build an upstream model from the integrated subsurface model by refining the second result data from the RFG simulation to a third spatial resolution that is finer than the second spatial resolution, provide the upstream model for use in an upstream simulation at the third spatial resolution and over a development or production timescale that is shorter than the second geological timescale, and store third result data from the upstream simulation in the integrated subsurface model.

Some embodiments may also include an apparatus including at least one processing unit and program code configured upon execution by the at least one processing unit to model a subsurface formation in any of the manners discussed herein. Some embodiments may also include a program product including a computer readable medium and program code stored on the computer readable medium and configured upon execution by at least one processing unit to model a subsurface formation in any of the manners discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

The herein-described embodiments utilize a number of techniques to implement reservoir fluid geodynamics modeling for the purpose of supporting appraisal and/or early development workflows in the oil & gas industry, among other applications. Before discussing these techniques, an example hardware and software environment, and an overview of oilfield operations, will first be discussed.

Hardware and Software Environment

Figure 1:
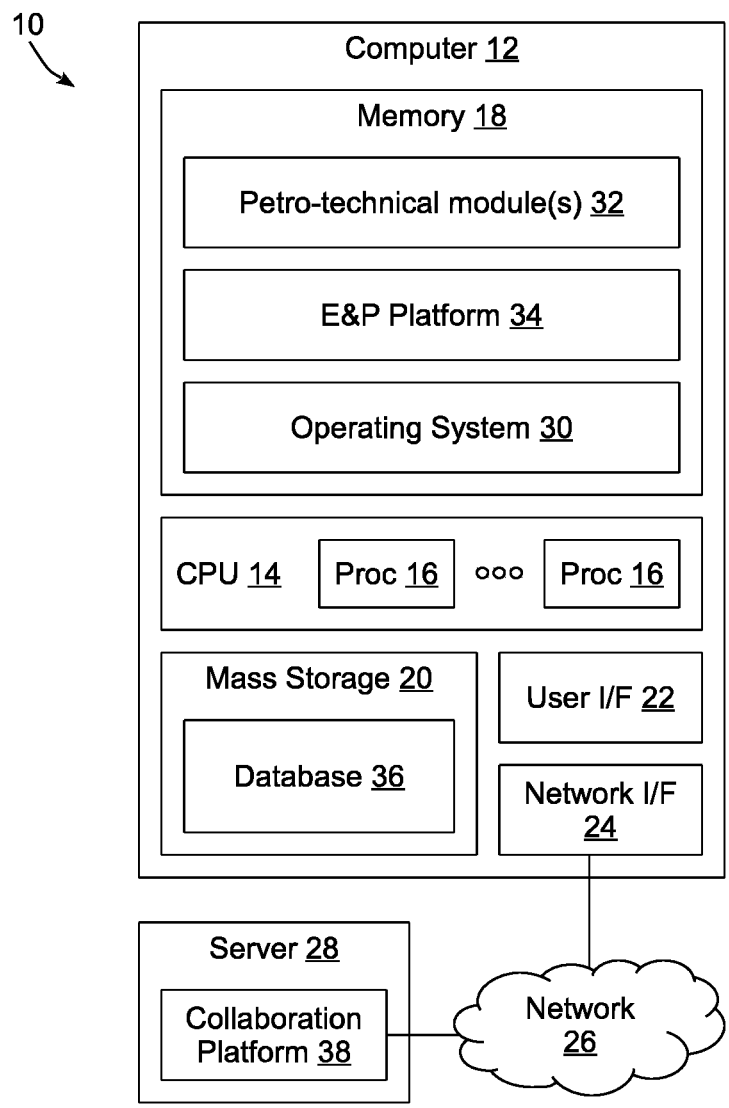
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

It will also be appreciated that the functionality disclosed herein may be implemented using various computer architectures. For example, the functionality disclosed herein may be implemented using one or more stand-alone computers or programmable electronic devices, one or more server-based data processing systems, one or more networked data processing systems, one or more client-server data processing systems, one or more peer-to-peer data processing system, one or more cloud-based data processing systems, one or more distributed data processing systems, or combinations thereof.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
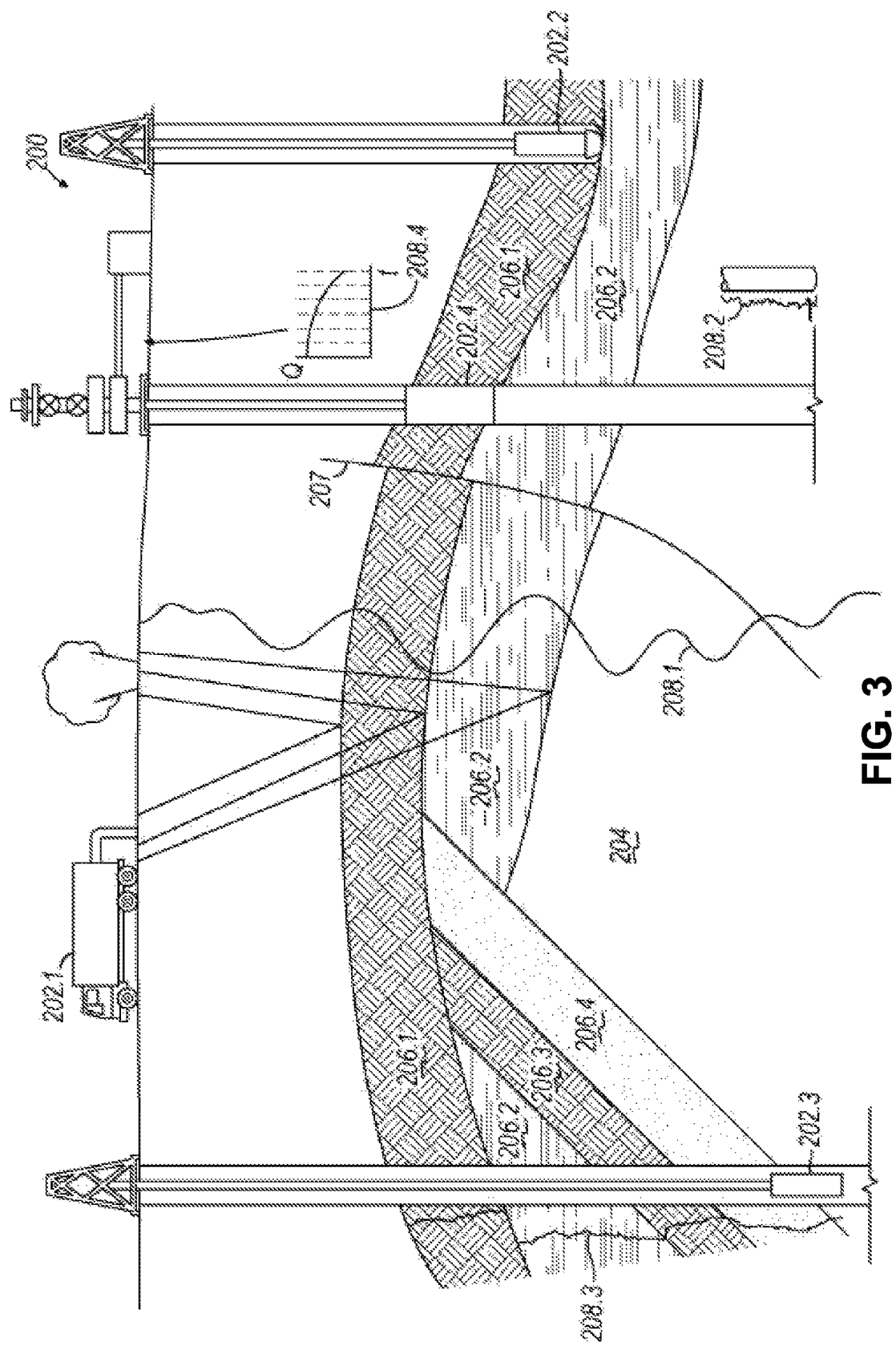
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
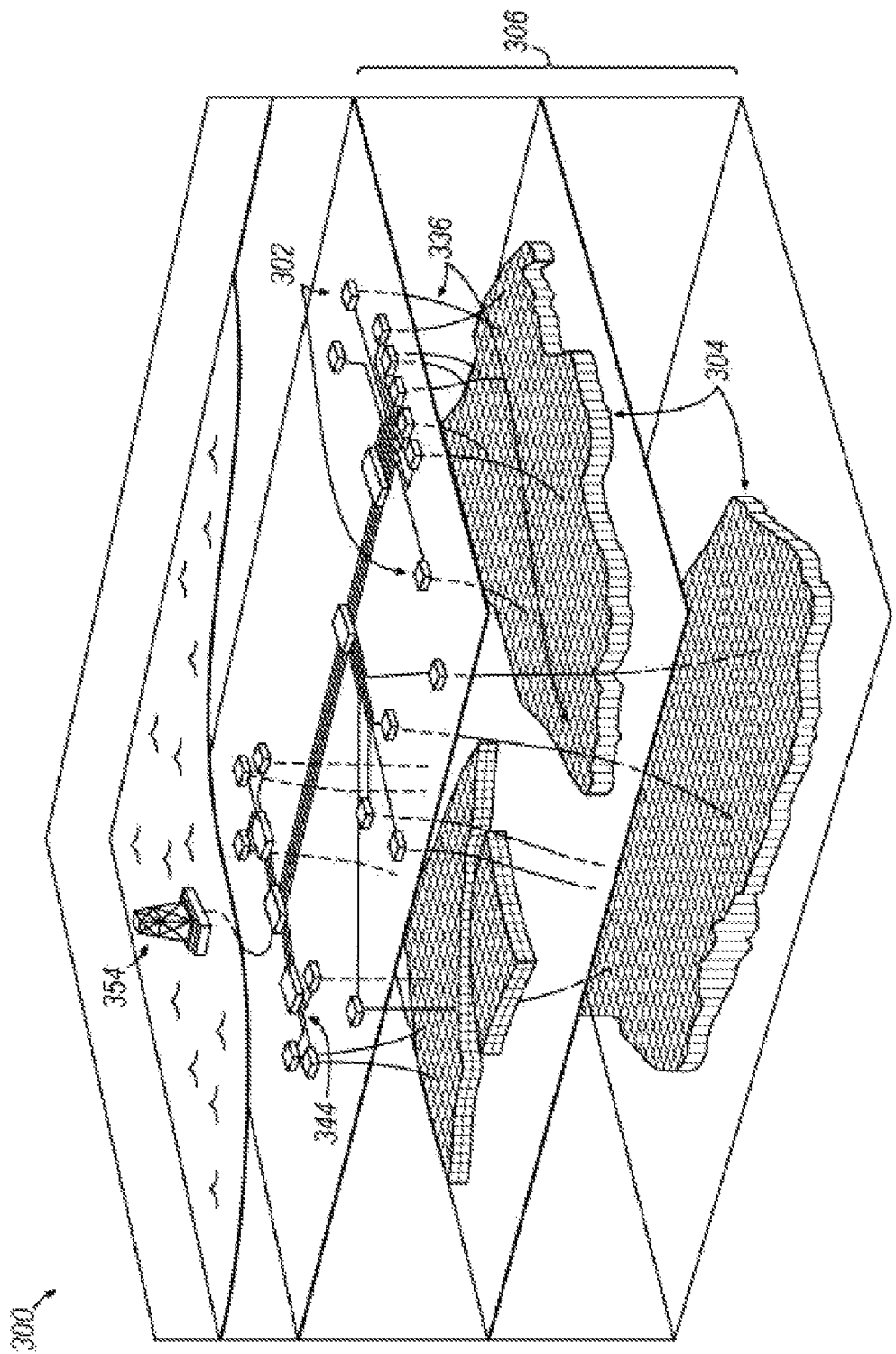
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Reservoir Fluid Geodynamics Modeling for Appraisal and Early Development

Field operations in the oil industry are commonly classified into the four phases of exploration, appraisal, development and production. About three of these phases are conventionally accompanied by modeling and simulation of relevant processes in the subsurface. For example, exploration models, i.e. basin modeling, focuses on the formation of sedimentary basins, the generation of hydrocarbons in source rocks, the migration of hydrocarbons and the accumulation of hydrocarbons in traps. High resolution reservoir models for production, in contrast, focus on subsurface flow during production, and cover processes such as hydrocarbon displacement by water injection. Reservoir modeling as such is generally set up to evaluate different production scenarios for development and production, i.e. engineering.

Exploration simulations generally rely on geological timescales of millions of years and are generally constructed for regional length scales of hundreds of kilometers, with a focus on sedimentary basins. Reservoir simulations generally cover production timescales up to decades and field sizes up to a few kilometers, and with a focus on structure with hydrocarbon accumulation. However, while both approaches have become standard workflows in the industry, it has been found that a gap exists in modeling and simulation of the subsurface generally corresponding to the appraisal and early development phases between exploration and production, and with a focus on petroleum system to field with multiple accumulations. Compositional gradients, especially when not in equilibrium, compartmentalization, tar mats, reservoir geochemistry, biodegradation, charging and spilling scenarios, etc. are generally neither accessible with exploration nor reservoir simulators as such processes generally occur on timescales up to 100,000 years, and include lateral extensions covering the nearby geological environment of a field, possibly incorporating its satellite structures. It has also been found that it would be beneficial to support simulations with lateral extends of 10 km or more but with finer resolution than is supported by basin modeling to assist in analyzing the geological background of a subsurface formation for appraisal and early development decisions.

Embodiments consistent with the invention implement a modeling and simulation approach suitable for appraisal and early development, referred to herein as Reservoir Fluid Geodynamics (RFG) modeling, which may be used to close the modeling gap that conventionally exists between exploration and production. Various embodiments may include modeling of corresponding physical processes in the subsurface, calibration of the models with field data (e.g. from Downhole Fluid Analysis (DFA)), usage of an RFG model for appraisal and/or early development decisions, and/or continuous simulation workflows from exploration to production with the benefit of one integrated database and one consistent set of models from exploration to production for all simulation steps in between.

In some embodiments, RFG modeling may be used to simulate processes such as reservoir diffusion. For example, Wang et al., *Differing Equilibration Times of GOR, Asphaltenes and Biomarkers as Determined by Charge History and Reservoir Fluid Geodynamics*, PETROPHYSICS, VOL. 56, NO. 5 (2015), which is incorporated by reference herein, discusses the gap that may occur between basin and reservoir modeling from the perspective of modeling reservoir diffusion, e.g., the modeling of mixing and equilibration of fluids in reservoirs on geological timescales of up to millions of years in duration. Basin simulators generally operate at higher end of such durations; however, conventional basin simulators generally rely on spatial resolutions that are insufficient to describe processes such as in reservoir diffusion. In contrast, while reservoir simulators theoretically possess sufficient resolutions for modeling in reservoir diffusion, such simulators are generally incapable of modeling a duration of time sufficient to model such processes.

Figure 5:
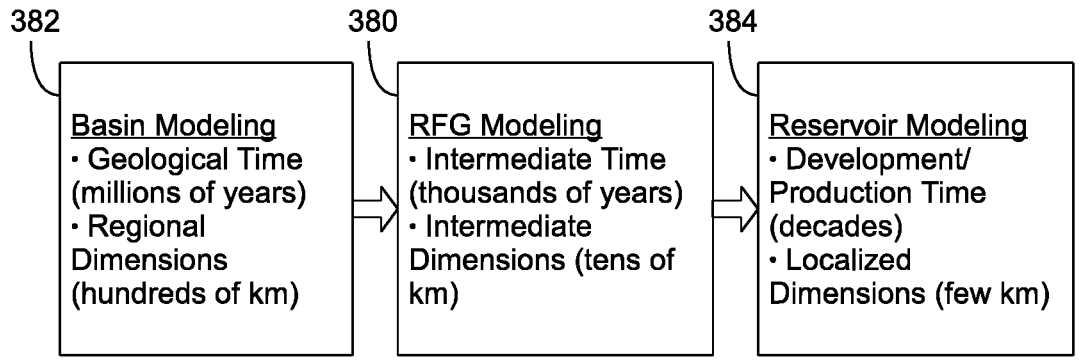
FIG. 5 is a block diagram illustrating the integration of reservoir fluid geodynamics modeling into an overall oil & gas modeling workflow suitable for use in the data processing system of FIG. 1.

Additional physical and/or geological processes may also occur on time scales within this modeling gap. For example, processes that occur on such time scales include, but are not limited to geochemical reactions such as oil cracking and thermochemical sulfate reduction, biodegradation, biological sulfate reduction, asphaltene precipitation, tar mat formation, fluid rock interactions such as cementation, etc. It has been found that modeling such processes in an environment with compartmentalization and reservoir baffling generally yields information which might strongly influence expectations about oil recovery and thus influence development plans. As shown in FIG. 5, for example, RFG modeling 380 fits well in between, in length scales (or spatial resolutions), timescales, overall geological background and the different phases of an oil field life, with basin modeling 382 and reservoir modeling 384. In particular, in some embodiments RFG modeling may be based upon both intermediate timescales (e.g., in terms of thousands of years, such as about 1000 to about 10,000,000 years, and intermediate dimensions (e.g., in terms of tens of kilometers, such as about 1 km to 100 km. This is generally in contrast with basin modeling, which generally relies on relatively longer geological timescales (e.g., in terms of 100's of millions of years) and regional lateral dimensions (e.g., in terms of 100's of kilometers), and reservoir modeling, which generally relies on development/production timescales (e.g., one year up to a few decades) and localized lateral dimensions (e.g., only a few kilometers). RFG modeling may also differ from basin modeling in terms of vertical dimensions, as basin modeling generally extends to the crust and the source rock, while RFG may focus on the reservoir.

Further, in some embodiments, RFG modeling may be useful in connection with modeling processes in other fields or industries such as $CO_2$ sequestration or nuclear waste disposal, among others.

Some embodiments consistent with the invention may be used, for example, to close a technical data flow gap between exploration and engineering. Conventionally, reservoir and basin models are distinct in size, resolution and data population, and are, as a result, set up completely independent of one other. In contrast, in some embodiments, an integrated subsurface model may be used to incorporate basin, RFG, and reservoir modeling data, and each of RFG and reservoir models may effectively be developed based upon refining a cut-out of the model data for an earlier-phase model, i.e., by using a refined cut-out of a portion of a basin model as an RFG model, and using a refined cut-out of a portion of an RFG model as a reservoir model. Thus, a consistent data set may be used for overall geological modeling across each of the four phases of field operations. As such, for example, generated hydrocarbon amounts, captured in a basin simulation, may be used for fluid distribution modeling in an RFG simulator, and then the resulting fluid distribution from the RFG simulation, even in a non-equilibrium case, may be used to define initial conditions for simulating production scenarios.

It will be appreciated that in some embodiments, pre-processing, post-processing and/or visualization tools may be used to manage and visualize this overall modeling process, and essentially with three simulators working one overall integrated database. Doing so may enable new workflows to be developed for modeling from exploration to production, and with iterative refinement of three intermediate models with respective time and length scales. Further, expensive data, such as DFA measurements, may be assessed in all tools simultaneously and used when applicable and appropriate, e.g. for understanding of mixing processes, leading directly to matching initial conditions in reservoir engineering.

Quantitative assessment of RFG modeling results thus, in some embodiments, may effectively provide a gapless integration of subsurface modeling from basin scale to one structure and from geological to production times. Doing so may allow for a new level of understanding of geological processes and enable new contiguous workflows between different domains. It will also be appreciated, however, that an RFG simulation may be run in some embodiments without data from a basin model, and further, in some embodiments the output generated from an RFG simulation may not be explicitly generated for use with reservoir or other upstream modeling, e.g., just for calibration purposes, such as calibration of fluid gradients.

RFG modeling may also differ from basin modeling in that RFG modeling may generally focus on a reservoir. Source rocks below a reservoir and overburden above a reservoir may not be included into an RFG model as the impact on RFG simulation would generally be minimal but the added complexity may be significant. Additionally, RFG timescales may, in some embodiments, incorporate substantially continuous feeding of an RFG model with hydrocarbons from a source rock from below, and thus may overlap with basin model timescales.

In addition, while three-dimensional modeling is discussed herein, in some embodiments RFG modeling may be in two dimensions, e.g., in vertical sections, i.e., with a single lateral dimension. Further, two- and three-dimensional modeling may be utilized in connection with the same integrated subsurface modeling described herein.

Figure 6:
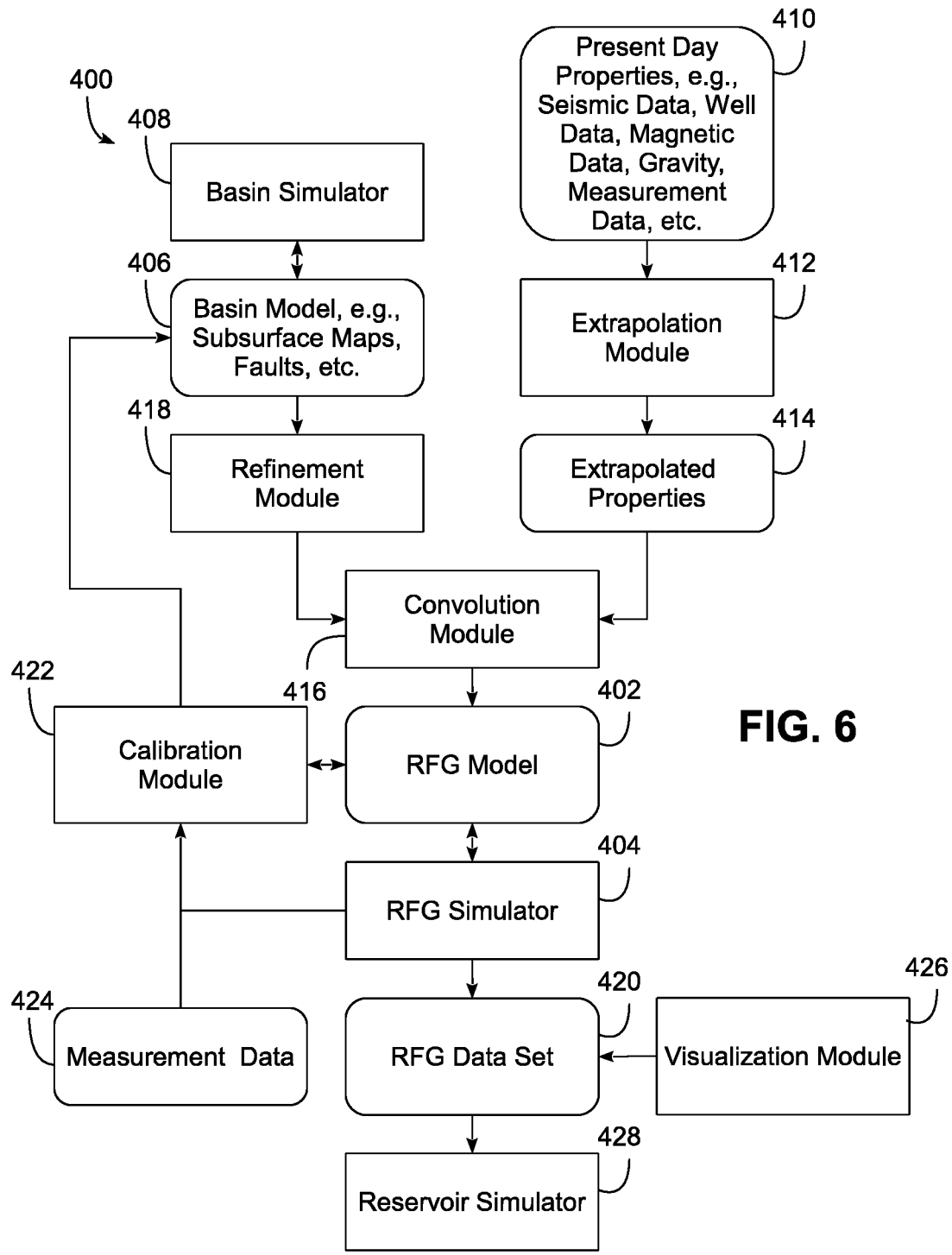
FIG. 6 is a block diagram illustrating an example workflow using basin, reservoir fluid geodynamics and reservoir simulators using the data processing system of FIG. 1.

FIG. 6, for example, illustrates a simulation environment 400 suitable for generating and using an RFG model 402 and RFG simulator 404 consistent with some embodiments of the invention. It will be appreciated that development of a model and simulator therefor generally incorporates modeling various workflows that may be subdivided into three parts: acquisition and setup of input data, simulation, and output data analysis.

For RFG model 402, input may be include basin data from a basin model 406 (e.g., as may be generated by a basin simulator 408), as many other data sources are generally not available for geological times. However, present day properties or data 410 may also be used in some embodiments and extrapolated back in geological time (e.g., using an extrapolation module 414) to generate a set of extrapolated properties 414 in case that some or all of the data, e.g. rock composition and properties, may not have changed dramatically over the modeling time range. As represented by convolution module 416, data from different sources may also be convoluted to one data set, e.g. mapped geological formation surfaces may be taken from basin model 406 and corresponding formation rock properties may be refined on the basis of seismic data and its interpretation from extrapolated properties 414. Thus, various data sources may be used for generating an RFG model 402 in different embodiments, e.g., basin models, seismic surveys with interpretation, well data (e.g. well logs), magnetic data, gravity, measurement data (e.g., from downhole fluid analysis), etc.

It will be appreciated that a model may be represented as any number of different types of gridded data sets, otherwise referred to herein as spatial arrays, so an RFG model may be configured in some embodiments to be similar to a basin model or a reservoir model, and represented at least in part as a two- or three-dimensional spatial array. The number of grid points or array elements may be similar, but due to the intermediate size between basin and reservoir models, "rough" basin modeling input data may also be refined by a refinement module 418 to allow for processing at a finer resolution than provided natively by a basin model (i.e., the basin model is at a coarser resolution than that used for RFG modeling). Such refinement may include various interpolation techniques to effectively generate an upsampled representation of at least a portion of the basin model.

In general, input data for RFG model 402 may include at least subsurface maps of geological formations, and in some instances, faults describing discontinuities between formations may also be provided as additional input to describe the overall geometry of a subsurface region. Additionally, rock properties describing the volumes between mapped surfaces and faults may be used, such as rock type (e.g., sandstone, shale, salt, limestone, etc.), porosity, shale content, etc. Fault properties, e.g., shale gouge content, may also be used.

In addition, generally the modeled region for RFG model 402 may be a cut-out of a larger environment, typically within a geological basin, and cut-out may be performed, for example, using refinement model 418. For modeling processes within RFG model 402 by RFG simulator 404, in and outflow of energy and/or fluid (water, hydrocarbons, non-hydrocarbons such as nitrogen, carbon dioxide, etc.), masses, pressures and/or mechanical constraints (e.g., outer stresses from tectonics), may also be used as input data. These values represent boundary data for the RFG simulation and may be retrieved from a basin model in some embodiments or may be estimated from general geological considerations. In addition, in some instances, hydrocarbon inflow, which may come from a source rock from below, may be provided from a basin model or other data source.

RFG simulator 404 may use RFG model 402 to model the evolution of mass and energy distributions, which may be described best as differential equations derived from local mass and energy conservation combined with disequilibrium forces of quantities which, according to physics, try to equilibrate. For example, diffusion flux equilibrates concentration gradients or heat flow temperature. Due to the intermediate size and timescale of the RFG model between basin and reservoir models, the processes, which are modeled, may differ from the established methods used for these other modeling techniques.

Simulations may be performed as forward modeling in time on a grid, similar as simulations performed by basin or reservoir simulators. The corresponding differential equations may approximately be solved with numerical approaches such as Finite Elements, Finite Control Volumes, Finite Differences or any combinations hereof.

As the RFG grid resolution is finer and the length scales smaller than in a basin model, it may be possible in some embodiments to realistically model varying fluid compositions within a reservoir or an accumulation but on geological timescales. Doing so may allow for the incorporation of modeling processes in RFG simulator 404 that are currently out of scope of existing tools. In some embodiments, for example, a grid resolution finer than about 100 m, e.g., between about 1 and about 100 m, may be used, and a geological timescale of greater than about 100 years, e.g., between about 100 and about 100 million years, may be used.

In various embodiments, RFG simulator 404 may model any combination of the following processes: diffusion of fluid compounds, e.g. compositional grading; fluid phase separation (PVT); separate phase flow, e.g. Darcy flow; biodegradation and biological sulfate reduction; secondary chemical cracking of oil; asphaltene flocculation; tar mat formation; pressure, temperature and stress variations; gas hydrates (fluid solid phase separation); flow baffling up to compartmentalization; thermochemical sulfate reduction; rock compaction, fracturing and rock failure; fluid rock interactions, e.g. cementation, dolomitization, smectite to illite transformations; magmatic intrusions, e.g. heat impact; ground water flow; convection; $CO_2$ sequestration; and/or impact of nuclear waste disposal on the geological environment, e.g. diffusion of radioactive compounds.

Moreover, in some embodiments, multiple of the aforementioned processes may be modeled in the same model and simulation, and in some embodiments, the combination or interaction of these multiple processes may modeled. Further, in some embodiments, which of multiple processes is modeled may be configurable, thereby providing for substantial flexibility in a simulation. It will be appreciated that the implementation of simulation of the aforementioned processes and the relative interaction therebetween in a grid would be well within the abilities of one of ordinary skill in the art having the benefit of the instant disclosure.

An RFG simulation by RFG simulator 404 results in the generation of an RFG data set 420. One target of RFG simulation may be a qualitative insight into the geological environment and the prediction of hydrocarbon related properties within and with its geological environment in the region of study combined with a quantitative assessment, especially of hydrocarbon amounts accessible for production.

Resulting fluid distributions generated by RFG simulator 404 may also be used for calibration purposes, e.g., by a calibration module 422, which compares simulated fluid distributions with measurement data 424, e.g. fluid samples from downhole fluid analysis (DFA). In case of not matching measurement data with a sufficient degree of accuracy, uncertain model parameters may be adjusted to achieve a better match after re-running the simulation. A calibration workflow may allow for adjusting the RFG model iteratively, achieving high accuracy for matching available data and thus potentially enhancing the predictive capability in regions with sparse data. Further, calibration may also be used to calibrate or otherwise update basin model 406. A separate calibration loop for basin model 406, similar to that for RFG model 402, may also be supported in some embodiments.

RFG data set 420 may be visualized and/or otherwise managed, e.g., using a visualization module 426 that enables output data to be visualized and used for further analysis.

RFG data set 420 may also be used to populate a reservoir model with data, depending upon the geological environment, and in particular the initial distribution of hydrocarbon compounds in spatial high resolution prior to production modeling. As such, RFG data set 420 may be provided to a reservoir simulator 428 in some embodiments. Additionally, flow baffles may be discovered and production rate predictions from reservoir simulation may resultantly become more accurate.

Some embodiments consistent with the invention therefore may provide modeling to be performed with arbitrary geometries and a non-trivial distribution of rock properties in an inhomogeneous geological environment. Further, some embodiments may also provide an ability to refine models and to continuously incorporate more data from different data sources to achieve more accuracy and thus continuously improve geological analysis. Further, running an RFG simulator with data from a calibrated basin model and using the output for setting up a reservoir model for production will allow for workflows covering geological time and length scales from basin size to field size and from geological times to production times.

Figure 7:
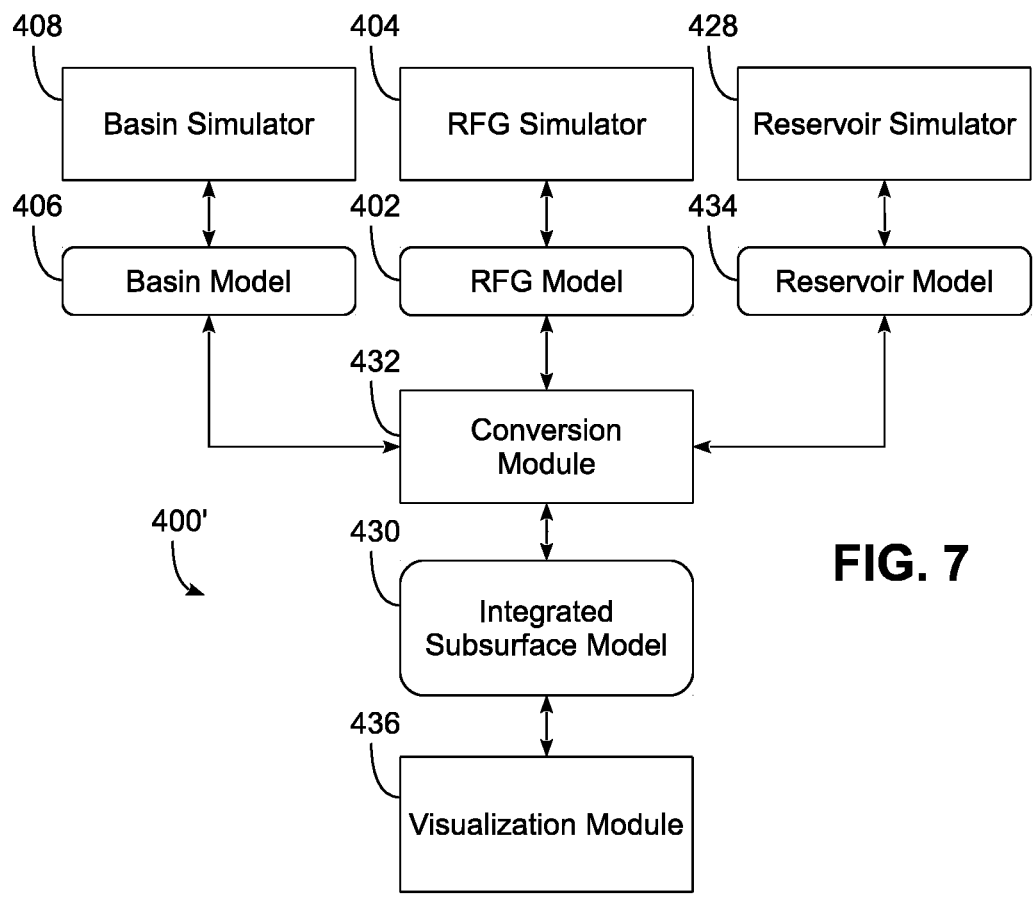
FIG. 7 is a block diagram illustrating an example integration of reservoir fluid geodynamics modeling into an integrated subsurface model in the data processing system of FIG. 1.

Now turning to FIG. 7, while an RFG model may be maintained separate from basin and/or reservoir models in some embodiments, in some embodiments, such as illustrated by simulation environment 400', an RFG model 402 may be integrated into an integrated database, referred to herein as an integrated subsurface model 430. Integrated subsurface model may include a collection of data representative of a subsurface volume, including data relevant to basin, RFG and reservoir simulation. To support the use of integrated subsurface model 430 by each of basin simulator 408, RFG simulator 404 and reservoir simulator 428, a conversion module 432 may be used to extract from integrated subsurface model 430 appropriate data for generating a simulator-specific model (e.g., RFG model 402, basin model 402, or a reservoir model 434) suitable for use with the particular RFG, basin and reservoir simulator 404, 408, 428. The extracted model may represent a cut-out of the overall modeled subsurface formation, and may be bounded by a timescale in some embodiments. Conversion module 432 may also include functionality for upsampling and/or downsampling data to accommodate the simulation grid used by the respective simulator 404, 408, 428. In addition, complementary functionality may be provided in conversion module 432 to incorporate simulation results from each simulator 404, 408, 428 into integrated subsurface model 430.

Integrated subsurface model 430 may further be accessible by a visualization module 436 suitable for visualizing and otherwise analyzing and managing the model. Visualization may also be supported separately within each simulator in some embodiments.

In embodiments, for example, an integrated subsurface model may be used to maintain basin data from a basin model, RFG data from an RFG model and upstream data usable in a finer resolution and shorter timescale upstream simulation, e.g., a reservoir simulation. The same overall dataset may therefore be used to run basin, RFG and/or upstream simulations, with upsampling, downsampling, refinement, cut-out, extraction, interpolation and/or other processing techniques used to maintain data within the integrated subsurface model and effectively convert that data on-demand to appropriate resolutions and/or formats for use with different types of simulations. Such embodiments may therefore enable basin, RFG and upstream simulations to be run sequentially or in different orders, with later simulations incorporating the result data generated by earlier simulations.

In one example embodiment, an integrated subsurface model may be maintained within a database or other accessible storage and may integrate basin data generated from basin simulation, RFG data generated from RFG simulation, and reservoir data generated from reservoir simulation. Basin, RFG and upstream simulation may be performed sequentially, with each simulation relying on a simulation-specific model extracted from the integrated subsurface model and refined or otherwise formatted with data appropriately formatted for a desired spatial resolution for a particular simulation, and further with simulation-specific models being based at least in part on result data generated from earlier simulation. Thus, for example, a basin model may be built from the integrated subsurface model, the basin model may be provided for use in a basin simulation at a first spatial resolution and over a first geological timescale, first result data from the basin simulation may be stored back into the integrated subsurface model, an RFG model may be built from the integrated subsurface model by refining the first result data from the basin simulation to a second spatial resolution that is finer than the first spatial resolution, the RFG model may be provided for use in an RFG simulation at the second spatial resolution and over a second geological timescale that is shorter than the first geological timescale; second result data from the RFG simulation may be stored back in the integrated subsurface model, and an upstream model may be built from the integrated subsurface model by refining the second result data from the RFG simulation to a third spatial resolution that is finer than the second spatial resolution. The upstream model may then be provided for use in an upstream simulation at the third spatial resolution and over a development or production timescale that is shorter than the second geological timescale, such that third result data from the upstream simulation may be stored back into the integrated subsurface model.

Now turning to FIGS. 8-11 various workflows for use in connection with an RFG model are described in greater detail. The workflows may be fully computer-implemented and automated in some embodiments, while in other embodiments, the workflows may be user-directed and may rely in part on user input, control and configuration of the various modules and simulators in a simulation environment. Furthermore, the workflows are premised on the use of an integrated subsurface model such as illustrated in FIG. 7, although similar functionality may be implemented in connection with an RFG model that is not incorporated into an integrated subsurface model.

Figure 8:
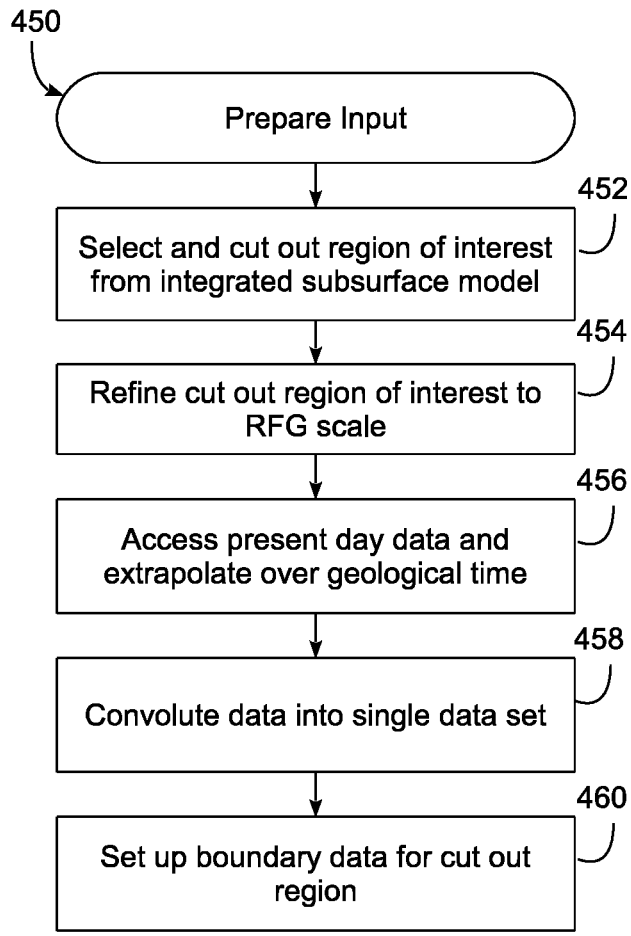
FIG. 8 is a flowchart illustrating an example sequence of operations for preparing input a reservoir fluid geodynamics simulation in the data processing system of FIG. 1.

FIG. 8, for example, illustrates a sequence of operations 450 for preparing input for an RFG simulation by RFG simulator 404. First, in blocks 452 and 454, a region of interest is selected and cut out of the integrated subsurface model and the cut out region of interest is refined to the desired scale for the RFG simulation, e.g., using refinement module 418 of FIG. 6. Next, in block 456, present day data is accessed and extrapolated over geological time (e.g., using extrapolation module 412 of FIG. 6) to scale the present day properties to the spatial resolution and timescale to be used for the RFG simulation. Next, the cut out data and the extrapolated data are convoluted into a single data set, e.g., using convolution module 416 of FIG. 6. In addition, boundary data for the cut out region may also be set up in block 460, e.g., in and outflow of energy and fluid such as hydrocarbons and water.

Figure 9:
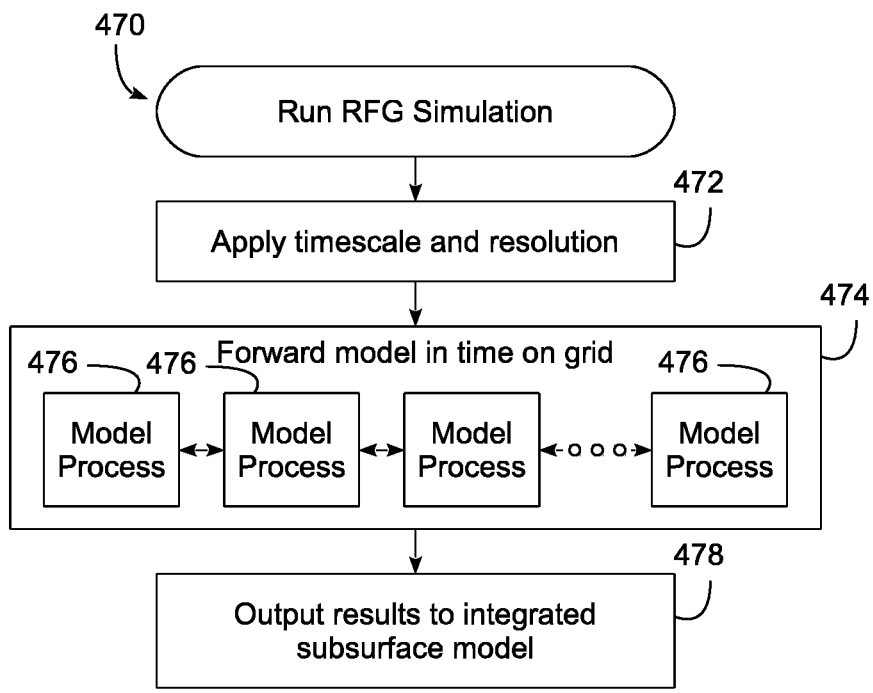
FIG. 9 is a flowchart illustrating an example sequence of operations for running a reservoir fluid geodynamics simulation in the data processing system of FIG. 1.

FIG. 9 illustrates a sequence of operations 470 for running an RFG simulation, e.g., using RFG simulator 404 of FIG. 6. In block 472, a timescale and resolution is applied to configure the duration of time and the resolution to use for the simulation. Next, block 474 forward models one or more processes 476 in time. In some embodiments, block 474 may be parallelized such that a plurality of processes are modeled in parallel, and in some instances, such that the combination or interaction of these processes may also be modeled (as represented by the arrows between blocks 476). Various techniques for parallelizing simulations and accounting for the interaction of different concurrently-modeled processes will be apparent to those of ordinary skill in the art having the benefit of the instant disclosure. Once the simulation is complete, results may then be output to the integrated subsurface model in block 478, e.g., using conversion module 432 of FIG. 7.

Figure 10:
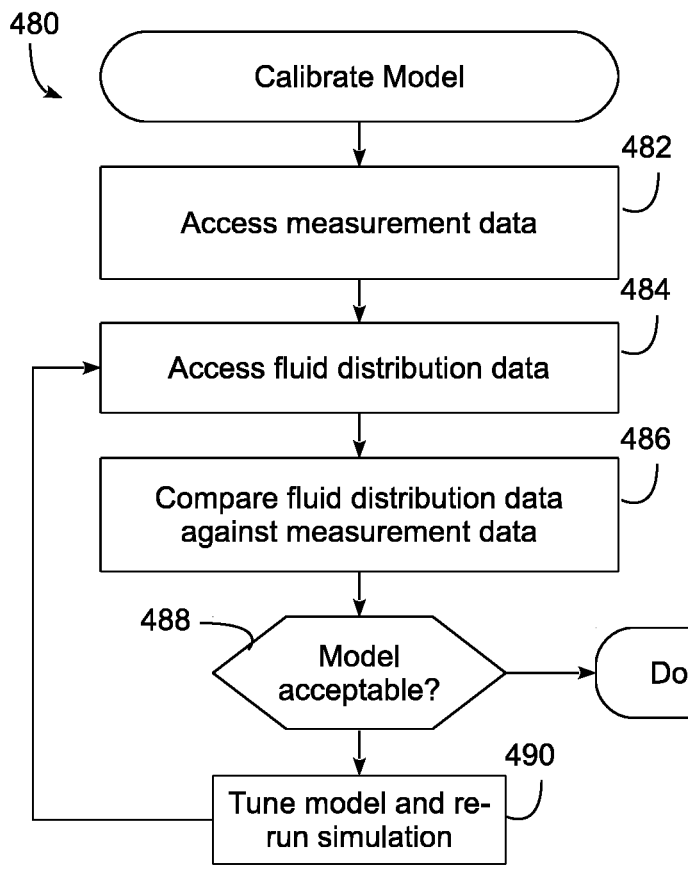
FIG. 10 is a flowchart illustrating an example sequence of operations for interactively calibrating a reservoir fluid geodynamics model in the data processing system of FIG. 1.

FIG. 10 illustrates a sequence of operations 480 for calibrating an RFG model, and begins in block 482 by measurement data, e.g., DFA data. Block 484 then accesses fluid distribution data from the RFG model, and block 486 performs a comparison between this data, e.g., using various model validation techniques that will be appreciated by those of ordinary skill in the art. Based upon this comparison, block 488 determines if the model is acceptable, i.e., is sufficiently accurate given the actual measurement data. If so, the sequence of operations is complete. If not, control passes to block 490 to tune the RFG model, e.g., using various tuning techniques known to those of ordinary skill in the art such as adjusting uncertain parameters. The simulation is then rerun and control returns to block 484 to re-access the fluid distribution data corresponding to the rerun simulation. Thus, calibration may be performed in an iterative manner until the model has been sufficient tuned to match the actual measurement data.

Figure 11:
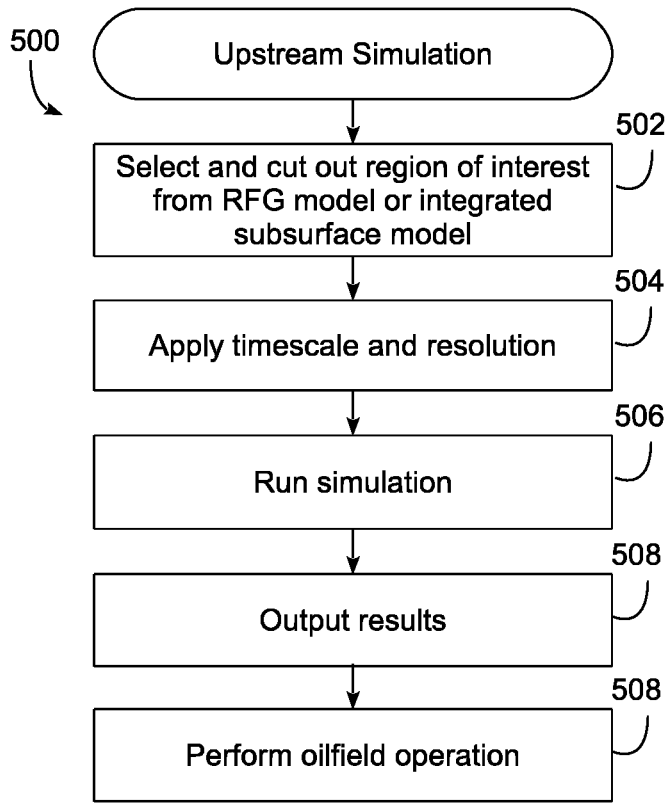
FIG. 11 is a flowchart illustrating an example sequence of operations for running a reservoir simulation using the reservoir fluid geodynamics model generated in FIGS. 8-10.

FIG. 11 next illustrates a sequence of operations 500 for performing an upstream simulation using an RFG model. In this example, the upstream simulation is a reservoir simulation, although it will be appreciated that other types of simulations may be performed using data from the RFG model. Block 502 first selects a region of interest cuts the selected region out of the RFG model or the integrated subsurface model (as appropriate). In addition, the cut out region of interest may also be refined to the desired scale for the upstream simulation, if appropriate. Next, block 504 applies the timescale and resolution for the simulation, and then in block 406 the simulation is run and in block 508 the results of the simulation are output, e.g., to the integrated subsurface model, to a separate simulation output, or to a visualization module for display and analysis. Further, as illustrated in block 510, the results of the simulation may also be used in the performance of an oilfield operation, e.g., to drill a well, determine a field development plan, to configure a surface network, to control a production and/or injection well, etc.

Figure 12:
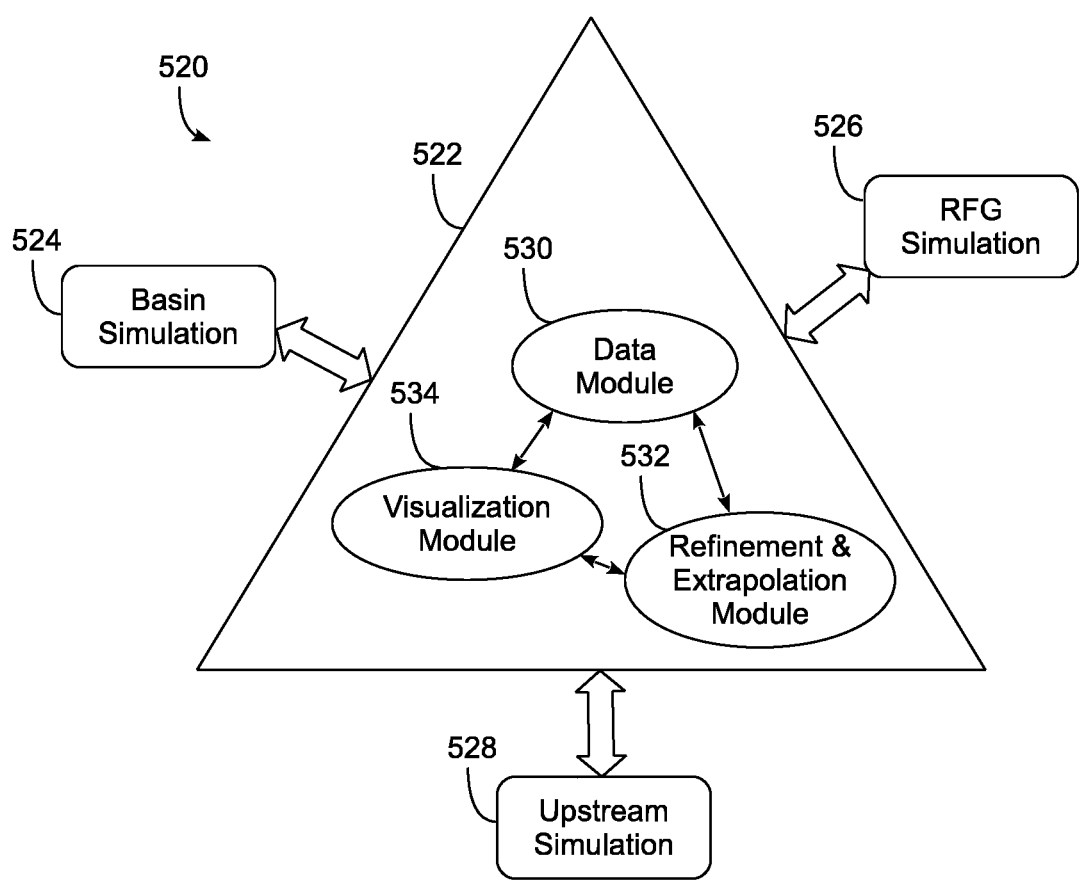
FIG. 12 is a block diagram illustrating an example integrated simulation environment using the data processing system of FIG. 1.

FIG. 12 illustrates another implementation of an integrated simulation environment 520 suitable for implementing the various techniques disclosed herein in a data processing system such as data processing system 10 of FIG. 1. In this environment, an integrated simulation platform 522 supports basin, RFG and upstream (e.g., reservoir) simulation 524, 526, 528 based upon integrated subsurface data maintained by platform 522. A data module 530 may be used to manage the integrated subsurface data in platform 522, with a refinement and extrapolation module 532 providing for refinement and/or extrapolation of the data, and a visualization module 534 providing for generation of data visualizations from the data in platform 522. Thus, in this embodiment, subsurface formation data, which may include measurement data, rock properties, subsurface maps, fault maps, and any of other types of data discussed above, may be accessed for the purpose of running simulations in each of a basin, RFG, and upstream (e.g., reservoir, surface network, production, etc.) context.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims. In addition, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of modeling a subsurface formation, the method comprising:
   accessing a Reservoir Fluid Geodynamics (RFG) model of the subsurface formation, wherein the RFG model is organized as a spatial array having a first spatial resolution and describing at least a portion of the subsurface formation, the RFG model including basin data generated from a basin simulation of the subsurface formation at a second spatial resolution that is coarser than the first spatial resolution;
   populating the RFG model with present day properties of the subsurface formation;
   convoluting the basin data and the present day properties into a single data set; and
   running a computer simulation of the RFG model over a geological timescale and at the first spatial resolution using at least one processing unit and the single data set.

2. The method of claim 1, wherein the first spatial resolution is used to model in reservoir diffusion in the subsurface formation.

3. The method of claim 1, wherein the first spatial resolution is finer than 100 meters, and wherein the geological timescale is greater than 100 years.

4. The method of claim 3, wherein the first spatial resolution is between 1 and 100 meters, and wherein the geological timescale is between 100 and 100 million years.

5. The method of claim 1, further comprising generating the RFG model, wherein generating the RFG model includes cutting out a region of interest from the subsurface formation, wherein the RFG model describes the cut out region of interest.

6. The method of claim 5, wherein generating the RFG model includes refining the basin data to populate the RFG model at the first spatial resolution.

7. The method of claim 5, wherein the present day properties include rock composition and/or rock properties generated from seismic data and/or well data.

8. The method of claim 7, wherein generating the RFG model further includes extrapolating the present day properties back in geological time.

9. The method of claim 1, further comprising generating boundary data for the computer simulation on the RFG model, the boundary data comprising data representative of in and outflow of energy, water, hydrocarbons, non-hydrocarbons, masses, pressures, mechanical constraints, or any combination of the above.

10. The method of claim 1, wherein the RFG model includes subsurface map data, fault data and rock property data describing volumes between mapped surface defined by the subsurface map data.

11. The method of claim 1, wherein running the computer simulation includes forward modeling evolution of mass and energy distributions over the geological timescale and at the first spatial resolution using differential equations derived from local mass and energy conservation and disequilibrium forces of quantities that are in processes of equilibrating.

12. The method of claim 1, wherein running the computer simulation includes modeling one or more processes, each of the one or more processes selected from the group consisting of: diffusion of fluid compounds; fluid phase separation; separate phase flow; biodegradation and biological sulfate reduction; secondary chemical cracking of oil; asphaltene flocculation; tar mat formation; pressure, temperature and stress variations; gas hydrates; flow baffling up to compartmentalization; thermochemical sulfate reduction; rock compaction, fracturing and rock failure; fluid rock interactions; magmatic intrusions; ground water flow; convection; $CO_2$ sequestration; and diffusion of radioactive compounds.

13. The method of claim 1, wherein running the computer simulation includes modeling a plurality of geological processes and modeling an interaction of at least two of the plurality of geological processes.

14. The method of claim 1, further comprising calibrating the RFG model by comparing simulated fluid distributions generated by running the computer simulation with downhole fluid analysis (DFA) measurement data and iteratively tuning the RFG model based upon the comparison.

15. The method of claim 1, further comprising:
    populating an upstream model with data generated from running the computer simulation; and
    running a second computer simulation on the upstream model.

16. The method of claim 15, wherein the upstream model comprises a reservoir model, and wherein populating the upstream model includes populating the reservoir model with an initial distribution of hydrocarbon compounds generated from running the computer simulation on the RFG model.

17. The method of claim 1, further comprising:
    maintaining within an integrated subsurface model of the basin data, RFG data from the RFG model and upstream data from an upstream simulation with a spatial resolution finer than the first spatial resolution and a timescale shorter than the geological timescale; and
    running basin, RFG and upstream simulations using data accessed from the integrated subsurface model.

18. The method of claim 17, wherein running the basin, RFG and upstream simulations includes:
    running the basin simulation to generate first result data;
    storing the first result data in the integrated subsurface model;
    refining and cutting out a portion of the first result data;

running the RFG simulation using the refined and cut out portion of the first result data to generate second result data;
refining and cutting out a portion of the second result data; and
running the upstream simulation using the refined and cut out portion of the second result data.

19. An apparatus, comprising:
at least one processing unit; and
program code configured upon execution by the at least one processing unit to model a subsurface formation by:
accessing a Reservoir Fluid Geodynamics (RFG) model of the subsurface formation, wherein the RFG model is organized as a spatial array having a first spatial resolution and describing at least a portion of the subsurface formation, the RFG model including basin data generated from a basin simulation of the subsurface formation at a second spatial resolution that is coarser than the first spatial resolution;
populating the RFG model with present day properties of the sub surface formation;
convoluting the basin data and the present day properties into a single data set; and
running a computer simulation of the RFG model over a geological timescale and at the first spatial resolution using at least one processing unit and the single data set.

20. A program product, comprising:
a non-transitory computer readable medium; and
program code stored on the computer readable medium and configured upon execution by at least one processing unit to model a subsurface formation by:
accessing a Reservoir Fluid Geodynamics (RFG) model of the subsurface formation, wherein the RFG model is organized as a spatial array having a first spatial resolution and describing at least a portion of the subsurface formation, the RFG model including basin data generated from a basin simulation of the subsurface formation at a second spatial resolution that is coarser than the first spatial resolution;
populating the RFG model with present day properties of the sub surface formation;
convoluting the basin data and the present day properties into a single data set; and
running a computer simulation of the RFG model over a geological timescale and at the first spatial resolution using at least one processing unit and the single data set.

21. An integrated subsurface formation simulation environment, comprising:
at least one processing unit and one or more non-transitory computer readable media;
an integrated subsurface model stored on the one or more non-transitory computer readable media, the integrated subsurface model including basin data generated from basin simulation, Reservoir Fluid Geodynamics (RFG) data generated from RFG simulation, and reservoir data generated from reservoir simulation; and
program code configured upon execution by the at least one processing unit to:
build a basin model from the integrated subsurface model;
provide the basin model for use in a basin simulation at a first spatial resolution and over a first geological timescale;
store first result data from the basin simulation in the integrated subsurface model;
build an RFG model from the integrated subsurface model by refining the first result data from the basin simulation to a second spatial resolution that is finer than the first spatial resolution;
provide the RFG model for use in an RFG simulation at the second spatial resolution and over a second geological timescale that is shorter than the first geological timescale;
store second result data from the RFG simulation in the integrated subsurface model;
build an upstream model from the integrated subsurface model by refining the second result data from the RFG simulation to a third spatial resolution that is finer than the second spatial resolution;
provide the upstream model for use in an upstream simulation at the third spatial resolution and over a development or production timescale that is shorter than the second geological timescale; and
store third result data from the upstream simulation in the integrated subsurface model.

* * * * *